(12) United States Patent
Reynolds et al.

(10) Patent No.: US 8,528,014 B2
(45) Date of Patent: Sep. 3, 2013

(54) LOCATION BASED USER AWARE VIDEO ON DEMAND SESSIONS

(75) Inventors: Jennifer Reynolds, Johns Creek, GA (US); Charles Dasher, Lawrenceville, GA (US); Paul Canter, Gainesville, GA (US)

(73) Assignee: Telefonaktiebolaget L M Ericsson (Publ), Stockholm (SE)

( * ) Notice: Subject to any disclaimer, the term of this patent is extended or adjusted under 35 U.S.C. 154(b) by 227 days.

(21) Appl. No.: 13/092,260

(22) Filed: Apr. 22, 2011

(65) Prior Publication Data

US 2012/0272261 A1 Oct. 25, 2012

(51) Int. Cl.
*H04N 7/16* (2011.01)

(52) U.S. Cl.
USPC ........ 725/30; 725/8; 725/12; 725/13; 725/14; 725/35; 725/46; 725/80; 725/87; 725/133; 725/141; 725/153; 348/734; 455/406; 455/420; 340/539.13; 705/34

(58) Field of Classification Search
None
See application file for complete search history.

(56) References Cited

U.S. PATENT DOCUMENTS

| | | | |
|---|---|---|---|
| 7,870,219 B2 | 1/2011 | McCormack et al. | |
| 2002/0068543 A1* | 6/2002 | Shah | 455/351 |
| 2005/0246746 A1* | 11/2005 | Yui et al. | 725/80 |
| 2007/0011040 A1* | 1/2007 | Wright et al. | 705/10 |
| 2007/0171091 A1* | 7/2007 | Nisenboim et al. | 340/825.69 |
| 2008/0263600 A1 | 10/2008 | Olague et al. | |
| 2008/0291074 A1* | 11/2008 | Tzeng et al. | 341/176 |
| 2009/0070797 A1* | 3/2009 | Ramaswamy et al. | 725/10 |
| 2009/0125971 A1 | 5/2009 | Belzs et al. | |
| 2010/0052854 A1* | 3/2010 | Jeun | 340/5.85 |
| 2010/0058405 A1 | 3/2010 | Ramakrishnan et al. | |
| 2010/0115592 A1* | 5/2010 | Belz et al. | 726/5 |
| 2010/0156627 A1* | 6/2010 | Kennedy | 340/539.16 |
| 2010/0333135 A1 | 12/2010 | Lau et al. | |
| 2011/0047299 A1* | 2/2011 | Yu et al. | 710/11 |
| 2011/0093876 A1* | 4/2011 | Belz et al. | 725/12 |
| 2011/0145581 A1* | 6/2011 | Malhotra et al. | 713/171 |
| 2011/0254683 A1* | 10/2011 | Soldan et al. | 340/539.13 |
| 2011/0273625 A1* | 11/2011 | McMahon et al. | 348/734 |
| 2012/0079541 A1* | 3/2012 | Pan | 725/62 |
| 2012/0266200 A1* | 10/2012 | Dasher et al. | 725/93 |

OTHER PUBLICATIONS

Apple TV. Retrieved from the Internet http:/www.apple.com/appletv/, Apr. 20, 2011.

* cited by examiner

*Primary Examiner* — Jason J Chung (57) ABSTRACT

A cable backend and a method are described herein for enabling a user with a location-aware mobile device to have at least partial control of a closest cable device (e.g., set top box, cable application) associated with a closest television. The closest cable device does not need to be associated with the user's home television but instead can be any cable device that is associated with a television located for instance at a stranger's house, an airport, a bar, or wherever.

18 Claims, 4 Drawing Sheets

LOCATION BASED USER AWARE VIDEO ON DEMAND SESSIONS

TECHNICAL FIELD

The present invention relates to a cable backend and a method for enabling a user with a location-aware mobile device to have at least partial control of a closest cable device (e.g., set top box, cable application) associated with a closest television. In addition, the present invention relates to the location-aware mobile device which enables the user to have at least partial control of the closest cable device associated with the closest television. The closest cable device does not need to be associated with the user's home television but instead can be any cable device that is associated with a television located for instance at a stranger's house, an airport, a bar, or wherever.

BACKGROUND

Traditional set top boxes (STBs) only allow a single user to be associated with them. The single user may have one or more set top boxes with which they can interact, typically those set top boxes are all located within the same household. Each home set top box has information (stored in a single household account) on rentals, premium content and similar, regardless of which home set top box was used to actually make the purchase for the rentals, premium content and similar. Increasingly, users expect their cable television to fit their "on the go lifestyle", with popular innovations such as multi-screen television where content (television programs, rental movies, premium content etc. . . . ) can be displayed on the user's television, computer or mobile device. While multi-screen television helps users consume content when they are away from their home, traditional set top boxes remain the most efficient method of delivering high quality video content to the user's television. However, the traditional set top box requires that the user be confined to their home to view the content on their television. Should the user leave their home, even if the user is near another set top box and television, that set top box will not be configured to access their account, reinforcing the perception that traditional television is a "at home" experience, only. The same problem occurs when there is no set top box but instead the hardware and software associated with the set top box forms a cable application which is located within the television. Thus, there has been and still is a need to address at least this shortcoming and other shortcomings which are satisfied by the present invention.

SUMMARY

A cable backend, a method, and a location-aware mobile device that address the shortcomings of the prior art are described in the independent claims of the present application. Advantageous embodiments of the cable backend, the method, and the location-aware mobile device have been described in the dependent claims of the present application.

In an aspect, the present invention provides a cable backend for enabling a user with a location-aware mobile device to have at least partial control of a closest cable device associated with a closest television. The cable backend comprises a login server, a location system (which stores fixed locations of a plurality of cable devices), and an accounting system (which maintains account details of the user). The login server is configured to receive a login command from the location-aware mobile device, the login command includes at least account information associated with the user and a current location of the user. The login server is configured to send the current location of the user to the location system. The location system is configured to store the current location of the user. The login server is configured to send a query to the location system to determine which one of the cable devices is located closest to the current location of the user. The location system is configured to determine which one of the cable devices is located closest to the current location of the user. The location system is configured to send information identifying the closest cable device to the login server. The login server is configured to send the information identifying the closest cable device to the location-aware mobile device. The login server is configured to send a request to the accounting system for at least a portion of the account details of the user stored therein. The accounting system is configured to send the at least a portion of the account details of the user to the login server. The login server is configured to send the at least a portion of the account details of the user to the closest cable device. The login server is configured to send a login confirmation to the location-aware mobile device to indicate to the user that they now have at least partial control of the closest cable device to control content displayed on the closest television. The cable backend has an advantage in that it enables the user to at least partially control the closest cable device which may be located outside of their home but can function in an identical manner as the cable devices located in their home.

In yet another aspect, the present invention provides a method for enabling a user with a location-aware mobile device to have at least partial control of a closest cable device associated with a closest television. The method is implemented by a cable backend comprising a login server, a location system, and an accounting system. The method comprises the steps of: (a) storing, at the location system, fixed locations of a plurality of cable devices; (b) maintaining, at the accounting system, account details of the user, (c) receiving, at the login server, a login command from the location-aware mobile device, the login command includes at least account information associated with the user and a current location of the user; (d) sending, from the login server, the current location of the user to the location system; (e) storing, at the location system, the current location of the user; (f) sending, from the login server, a query to the location system to determine which one of the plurality of cable devices is located closest to the current location of the user; (g) determining, at the location system, which one of the plurality of cable devices is located closest to the current location of the user; (h) sending, from the location system, information identifying the closest cable device to the login server; (i) sending, from the login server, the information identifying the closest cable device to the location-aware mobile device; (j) sending, from the login server, a request to the accounting system for at least a portion of the account details of the user stored therein; (k) sending, from the accounting system, the at least a portion of the account details of the user to the login server; (l) sending, from the login server, the at least a portion of the account details of the user to the closest cable device; and (m) sending, from the login server, a login confirmation to the location-aware mobile device to indicate to the user that they now have at least partial control of the closest cable device to control content displayed on the closest television. The method has an advantage in that it enables the user to at least partially control the closest cable device which may be located outside of their home but can function in an identical manner as the cable devices located in their home.

In still yet another aspect, the present invention provides a location-aware mobile device configured to interact with a cable backend to enable a user of the location-aware mobile device to have at least partial control of a closest cable device associated with a closest television. The location-aware mobile device comprises: (a) a positioning system configured to determine a current location of the user; (b) processor; and (c) a memory that stores processor-executable instructions therein where the processor interfaces with the memory and executes the processor-executable instructions to: (i) send a login command to the cable backend, where the login command includes at least account information associated with the user and the current location of the user; and (ii) receive a login confirmation from the cable backend, where the login confirmation indicates to the user that they now have at least partial control of the closest cable device to control content displayed on the closest television. The location-aware mobile device has an advantage in that it enables the user to at least partially control the closest cable device which may be located outside of their home but can function in an identical manner as the cable devices located in their home.

In yet another aspect, the present invention provides a method implemented by a location-aware mobile device for enabling a user to interact with a cable backend to have at least partial control of a closest cable device associated with a closest television. The method comprising the steps of (a) determining a current location of the user; (b) sending a login command to the cable backend, where the login command includes at least account information associated with the user and the current location of the user; and (c) receiving a login confirmation from the cable backend, where the login confirmation indicates to the user that they now have at least partial control of the closest cable device to control content displayed on the closest television. The method has an advantage in that it enables the user to at least partially control the closest cable device which may be located outside of their home but can function in an identical manner as the cable devices located in the user's home.

Additional aspects of the invention will be set forth, in part, in the detailed description, figures and any claims which follow, and in part will be derived from the detailed description, or can be learned by practice of the invention. It is to be understood that both the foregoing general description and the following detailed description are exemplary and explanatory only and are not restrictive of the invention as disclosed.

BRIEF DESCRIPTION OF THE DRAWINGS

A more complete understanding of the present invention may be obtained by reference to the following detailed description when taken in conjunction with the accompanying drawings.

DETAILED DESCRIPTION

Figure 1:
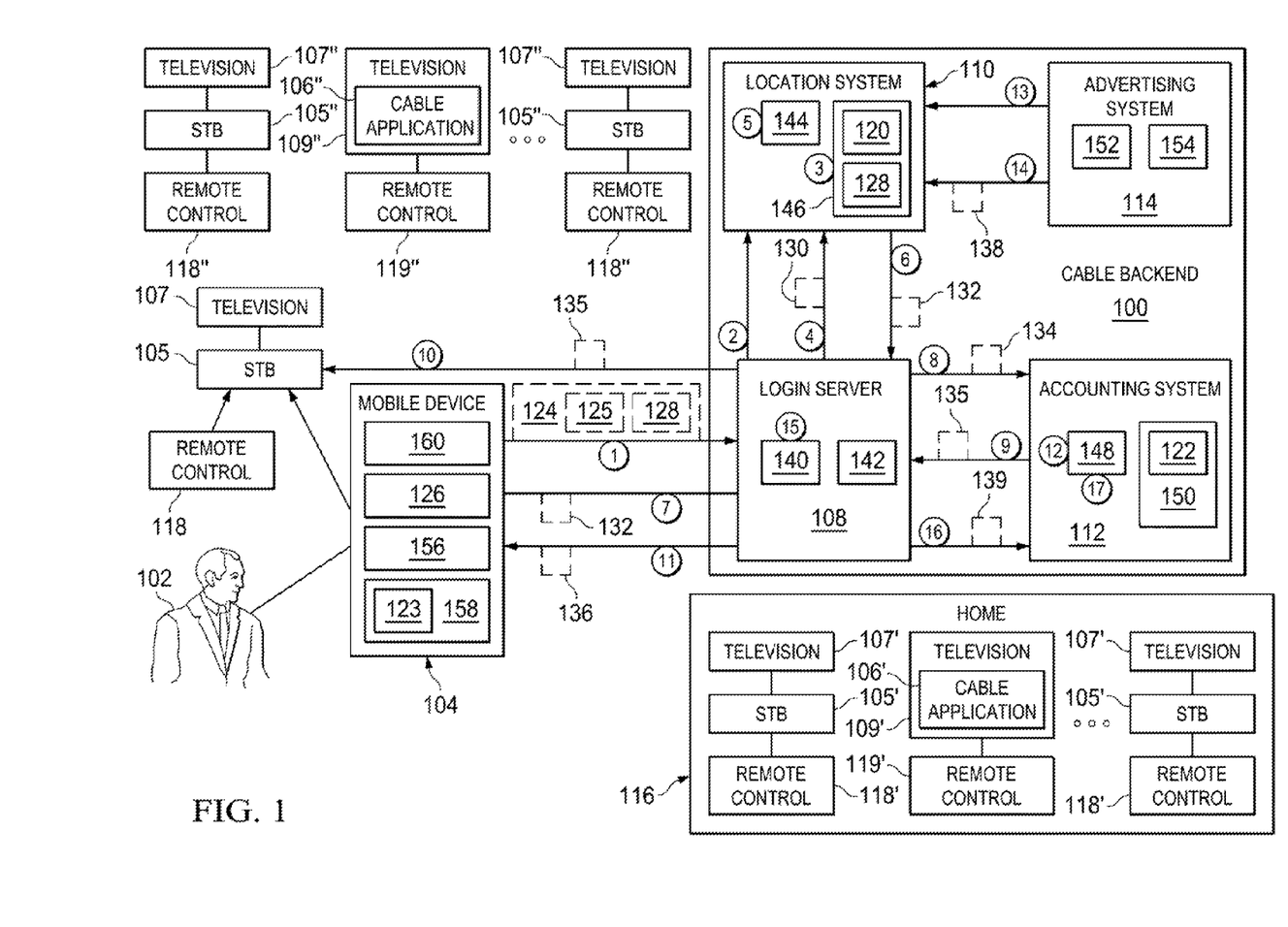
FIG. 1 is a block diagram of a cable backend that enables a user with a location-aware mobile device to have at least partial control of a closest cable device (e.g., closest set top box, closest cable application) in accordance with an embodiment of the present invention.

Referring to FIG. 1, there is a block diagram of an exemplary cable backend 100 configured to enable a user 102 (only one shown) with a location-aware mobile device 104 (e.g., smart mobile phone, laptop computer, personal digital assistant, Ipad®) to have at least partial control of a closest cable device 105 (e.g., closest set top box 105) associated with a closest television 107 in accordance with an embodiment of the present invention. The cable backend 100 includes a login server 108 (check-in server 108), a location system 110, an accounting system 112 (billing system 112), and an advertising system 114 (demographic system 114).

The login server 108 interfaces with and controls a number of set top boxes 105, 105' and 105" (cable devices 105, 105' and 105") which are respectively connected to televisions 107, 107' and 107". In this example, the set top boxes 105' and corresponding televisions 107' are located in a home 116 of the user 102, and the set top boxes 105 and 105" and corresponding televisions 107 and 107" are located outside of the home 116 of the user 102. In this scenario, the user 102 is currently located next to set top box 105 and television 107 and hence this particular set top box 105 and television 107 are referred to herein as being the closest set top box 105 and the closest television 107.

In addition, the login server 108 can interface with and control a number of cable applications 106' and 106" (cable devices 106' and 106") which are respectively located within the televisions 109' and 109". In this example, the connected television 109' including the cable application 106' is located in the home 116 of the user 102, and the connected televisions 109" including the cable applications 106" are located outside of the home 116 of the user 102. Each cable device 105, 105', 105", 106' and 106" can be controlled by a corresponding remote control 118, 118', 118", 119' and 119" to determine the content displayed on the corresponding televisions 107, 107', 107', 109' and 109".

The login server 108 also interfaces and communicates with the location-aware mobile device 104. The location system 110 stores fixed locations 120 (geographical locations 120) of the cable device 105, 105', 105", 106' and 106". The accounting system 112 stores and maintains account details 122 (billing and subscription details 122) of the user 102.

An exemplary scenario is discussed in next were the cable backend 100 enables the user 102 with the location-aware mobile device 104 to have at least partial control of the closest set top box 105 to control the content displayed on the closest television 107 as follows:

1. The login server 108 is configured to receive a login command 124 from the location-aware mobile device 104. Typically, the user 102 when located next to a set top box 105 (for example) would interact with an application 123 stored within their location-aware mobile device 104 to send the login command 124 to the login server 108. The login command 124 includes at least account information 125 (e.g., account number and password) associated with the user 102 and a current location 128 of the user 102. To accomplish this, the location-aware mobile device 104 includes a positioning system 126 (e.g., global positioning system 126) configured to determine the current location 128 of the user 102.

2. The login server 108 is configured to send the current location 128 of the user 102 to the location system 110.

3. The location system 110 is configured to store the current location 128 of the user 102.

4. The login server 108 is configured to send a query 130 to the location system 110 to determine which one of the cable devices 105, 105', 105", 106' and 106" is located closest to the current location 128 of the user 102. If desired, the login server 108 can be configured to send the user's current location 128 and the query 130 at same time to the location system 110.

5. The location system 110 upon receiving the query 130 is configured to determine which one of the cable devices 105, 105', 105", 106' and 106" is located closest to the current location 128 of the user 102. For example, the location system 110 would compare the user's current location 128 to the previously stored fixed locations 120 of the cable devices 105, 105', 105", 106' and 106" to determine that the user 102 is located next to set top box 105 (closest set top box 105).

6. The location system 110 is configured to send information 132 identifying the closest set top box 105 to the login server 108.

7. The login server 108 is configured to send the information 132 identifying the closest set top box 105 to the location-aware mobile device 104.

8. The login server 108 is configured to send a request 134 to the accounting system 112 for at least a portion 135 (e.g., rental history, active rentals, demographics, rating restrictions, billing information (in the case of full set top control)) of the account details 122 of the user 102. In addition, the login server 108 informs the accounting system 112 that the user 102 will have temporary control of the closest set top box 105 to select the specific content which is displayed on the closest television 107.

9. The accounting system 112 is configured to send the portion 135 (e.g., rental history, active rentals, demographics, rating restrictions, billing information (in the case of full set top control)) of the user's account details 122 to the login server 108.

10. The login server 108 is configured to send the portion 135 of the user's account details 122 to the closest set top box 105. At this point, the closest set-top box 105 which happens to be located outside of the home 116 of the user 102 can now function in an identical manner as the one or more cable devices 105' and 106' located in the home 116 of the user 102.

11. The login server 108 is configured to send a login confirmation 136 to the location-aware mobile device 104 to indicate to the user 102 that they now have at least partial control of the closest set top box 105 so they can now control what content is displayed on the closest television 107 (see exemplary use case nos. 1-4—discussed below).

12. The accounting system 112 is further configured to process more than one user-billing account for the closest set top box 105 if the user 102 is logged-in to the closest set top box 105 (see exemplary use case no. 1—discussed below). In this situation, the user 102 has temporary control of the closest set top box 105 using the location-aware mobile device 104 or the traditional set top box remote control 118 so the user 102 can at least navigate video on demand catalogs, watch premium content, and rent movies that will be processed through their billing account. In particular, the accounting system 112 would process one user-billing account associated with the closest set top box 105 for the original owner/subscriber (not shown) and process another user-billing account associated with the closest set top box 105 for the user 102. In other words, the user 102 is responsible for paying any fees for viewing content on the closest television 107 while the user 102 is logged-in to and has control of the closest set top box 105. Plus, the original owner/subscriber would be responsible for paying any fees for viewing content on the closest television 107 when the user 102 is not logged-in to and controlling the closest set top box 105.

13. The advertising system 114 (optional) is configured to interact with the location system 110 and obtain the user's current location 128 to track demographics of the user 102. If desired, the advertising system 114 can be configured to interact with the location system 110 to obtain the current locations of multiple users (not shown) to track the demographics of the multiple users 102 (only one shown).

14. The advertising system 114 (optional) is configured to utilize the user's location information 128 and other information (e.g., user's account details 122, other user's location information) to send target advertising 138 to the user 102 and if desired the other users (not shown) based on the tracked demographics.

15. The login server 108 logs-out the user 102 from the closest set top box 105 if the user 102 uses the location-aware mobile device 104 to actively close their control of the closest set top box 105. In addition, the login server 108 can log-out the user 102 from the closest set top box 105 if the user 102 moves the location-aware mobile device 104 a predetermined distance away from the closest set top box 105. To accomplish this, the location-aware mobile device 104 would have to send periodic updates of the user's current location 128 to the login server 108.

16. The login server 108 sends a log-out message 139 to the accounting system 112 if the login server 108 had complete control of the closest set top box 105 using the location-aware mobile device 104 or the traditional set top box remote control 118 to at least navigate video on demand catalogs, watch premium content, and rent movies (see exemplary use case no. 1—discussed below).

17. The accounting system 112 upon receiving the log-out message 139 would stop billing the user 102 for content displayed on the closest television 107 and start billing the original subscriber-user associated with the closest set top box 105 for future content displayed on the closest television 107.

In the aforementioned exemplary scenario, the cable backend 100 is described as enabling the user 102 with the location-aware mobile device 104 to have at least partial control of the closest set top box 105 and hence control of the content displayed on the closest television 107. However, it should be appreciated that the cable backend 100 can also function to enable the user 102 with the location-aware mobile device 104 depending on their current location to have at least partial control of anyone of the cable devices 105', 105', 106' and 106" associated with the televisions 107', 107", 109' and 109'". Furthermore, it should be appreciated that the cable backend 100 can function to enable any number of users 102 with location-aware mobile devices 104 to have at least partial control over their respective closest cable devices 105, 105', 105", 106' and 106".

The login server 108 has one or more processors 140 and memory 142 (storage 142) that includes processor-executable instructions where the one or more processors 140 is adapted to interface with the memory 142 and use hardware or execute the processor-executable instructions to implement at least the aforementioned steps 1, 2, 4, 7, 8, 10, 11, 15, and 16 In one example, the one or more processors 140 and the memory 142 are implemented, at least partially, as some combination of software, firmware, hardware, or hard-coded logic.

The location system 110 has one or more processors 144 and memory 146 (storage 146) that includes processor-executable instructions where the one or more processors 144 is adapted to interface with the memory 146 and use hardware or execute the processor-executable instructions to implement at least the aforementioned steps 3, 5, and 6. In addition, the memory 146 can store the user's current location 128 and the fixed locations 120 (geographical locations 120) of the cable devices 105, 105', 105", 106; and 106". In one example, the one or more processors 144 and the memory 146 are implemented, at least partially, as some combination of software, firmware, hardware, or hard-coded logic.

The accounting system 112 has one or more processors 148 and memory 150 (storage 150) that includes processor-executable instructions where the one or more processors 148 is adapted to interface with the memory 150 and use hardware or execute the processor-executable instructions to implement at least the aforementioned steps 9, 12 and 17 In addition, the memory 150 stores the user's account details 122 (billing and subscription details 122). In one example, the one or more processors 148 and the memory 150 are implemented, at least partially, as some combination of software, firmware, hardware, or hard-coded logic.

The advertising system 114 has one or more processors 152 and memory 154 (storage 154) that includes processor-executable instructions where the one or more processors 152 is adapted to interface with the memory 154 and use hardware or execute the processor-executable instructions to implement at least the aforementioned steps 13 and 14. In one example, the one or more processors 152 and the memory 154 are implemented, at least partially, as some combination of software, firmware, hardware, or hard-coded logic.

The location-aware mobile device 104 has one or more processors 156 and memory 158 (storage 158) that includes processor-executable instructions where the one or more processors 156 is adapted to interface with the memory 158 and use hardware or execute the processor-executable instructions to help implement at least the aforementioned steps 1, 7, 11 and 15. In one example, the one or more processors 156 and the memory 158 are implemented, at least partially, as some combination of software, firmware, hardware, or hard-coded logic. In addition, the location-aware mobile device 104 includes a user interface 160 that enables the user 102 to control the closest set top box 105 after the aforementioned step 11. Furthermore, the location-aware mobile device 104 includes a software application 123 installed thereon that the user 102 can access to communicate with the cable backend 100.

There are several exemplary use case nos. 1-4 described next to help further explain some of the capabilities, features and benefits which are associated with the present invention.
Use Case No 1: A User 102 "Logs-in" to a STB 105

1. The user 102 is located near a compatible cable device 105, 105', 105', 106' and 106" which is perhaps located at an airport, a bar, a stranger's house, a friends' house, or even their own home 116.

2. The user 102 has a location-aware mobile device 104 which has the software application 123 installed thereon that can communicate with the cable backend 100. The user 102 accesses the software application 123 and gives it permission to transmit the login command 124 which includes their current location 128 to the login server 108 (see FIG. 1's step 1).

3. The login server 108 and the location system 110 processes the user's current location 128 and returns information 132 and 136 to the location-aware mobile device 102 about the particular set top box 105 that is located closest to the user 102 which is presumably the set top box 105 that the user 102 is standing in front of (see FIG. 1's steps 2-11).

4. The user 102 now is "logged-in" to the closest set top box 105. At this time, the user 102 can control the set top box 105 via a software remote control on their location-aware mobile device 104, or through the traditional set top box remote control 118. For instance, the user 102 can navigate video-on-demand (VOD) catalogs, watch premium content they may have access to, watch rental sessions, and rent movies that will be processed normally through their billing account 122 just as they would have if using one of the set top box 105' located at their home 116 (see FIG. 1's steps 10-11). At this time, the accounting system 112 would start billing the user 102 for content displayed on the closest television 107 (see FIG. 1's step 12). Plus, the advertising system 114 can register the user's presence for targeted advertising, and demographics tracking (see FIG. 1's steps 13 and 14).

5. The user 102 actively closes the software application 123 in their location-aware mobile device 104, or they walk a set distance away from the closest set top box 105, then the login server 108 logs the user 102 out of the closest set top box 105 (see FIG. 1's step 15).

6. The login server 108 sends the log-out message 139 to the accounting system 112 which upon receipt of the log-out message 139 would stop billing the user 102 for content displayed on the closest television 107 (see FIG. 1's steps 16 and 17).
Use Case No. 2: A User 102 "Checks-in" to a STB 105

1. The user 102 is away from their home 116 and located near a compatible set top box 105. This set top box 105 would not allow the user 102 to have full "owner" control for whatever reason maybe some other user is already logged-in, and as a result the user 102 can only "check-in" to the set top box 105.

2. The user 102 has a location-aware mobile device 104 which has the software application 123 installed thereon that can communicate with the cable backend 100. The user 102 accesses the software application 123 and gives it permission to transmit the login command 124 which includes their current location 128 to the login server 108 (see FIG. 1's step 1).

3. The login server 108 and the location system 110 processes the user's current location 128 and returns information 132 and 136 to the location-aware mobile device 102 about the particular set top box 105 that is located closest to the user 102 which is presumably the set top box 105 that the user 102 is standing in front of (see FIG. 1's steps 2-11).

4. The user 102 is now "checked-in" and has limited use of the closest set top box 105 (see FIG. 1's step 11). For instance, the user 102 which is "checked-in" to the closest set top box 105 would have limited control of the closest set top box 105 using the corresponding set top box remote control 118 so the user can at least access their personal content, free content, or any content they have previously purchased. In this case, the user's premium content and rental sessions are available through the closest set top box 105 for viewing on the closest television 107. However, the user 102 can not control the closest set top box 105 by using the software remote control on their location-aware mobile device 104 to prevent multiple remote controls from vying for control of the closest set top box 105. In this case, the user 102 while away from their home 116 cannot make purchases, but the user 102 can view any free content, or content they have already purchased on the closest television 105. At this time, the advertising system 114 can register the user's presence for targeted advertising, and demographics tracking (see FIG. 1's steps 13 and 14).

5. The user 102 actively closes the software application 123 in their location-aware mobile device 104, or they walk a set distance away from the closest set top box 105, then the login server 108 logs the user 102 out of the closest set top box 105 (see FIG. 1's step 15).

Use Case No. 3: Multiple Users 102 Checked into the Same STB 105

1. The user 102 wishes to "check-in" to the closest set top box 105 which already happens to have one user 102 "logged-in" and possibly one or more other users 102 "checked-in" to it. As described above, the user 102 would utilize their location-aware mobile device 104 to "check-in" with the cable backend 100 by providing their current location 128 to the login server 108 (see FIG. 1's step 1).

2. Once "checked-in", each user's content including their rental sessions and their premium content is made available at the closest set top box 105 for viewing by all of the users on the closest television 107 (see FIG. 1's step 11).

3. The advertising system 114 takes into account all of the "checked-in" users 102 and the single "logged-in" user 102 when recommending movies, targeting ads, and building demographic pictures of the audience (see FIG. 1's steps 13 and 14).

4. When anyone of the users 102 log-out from the closest set top box 105, then their content is no longer available for viewing by the other users 102 who remain "checked-in" or "logged-in" to the closest set top box 105. Plus, the advertising system 114 no longer takes into account the logged-out user 102 when recommending movies, targeting ads, and building demographic pictures of the audience (see FIG. 1's step 1).

Use Case No. 4: STB 105 Information Transfer

1. Assume the user 102 is currently "checked-in" or "logged-in" to the closest set top box 105 that is playing a movie.

2. The user 102 has to leave the closest set top box 105, but wishes to finish the movie later. In this case, the user 102 would use the software application 123 on their location-aware mobile device 104 to send a request to the login server 108 to "save" this movie to their account (which might necessitate actually purchasing rental rights if the movie is not free, or already rented by the user 102).

3. The login server 108 upon receiving this request obtains the information on what movie is currently playing on the closest set top box 105, and what time code the movie is at, and uses this information to make a new session in the user's account details 122.

4. The user 102 can then access this new session as if they had been watching the movie all along from their own account, and can watch it at any applicable cable device 105, 105', 105', 106' and 106" or multi-screen platform by starting the movie at the time they saved it when watching it on the closest set top box 105.

In the aforementioned use case nos. 1-4, the cable backend 100 is described as enabling the user 102 with the location-aware mobile device 104 to have at least partial control of the closest set top box 105 and hence control of the content displayed on the closest television 107. However, it should be appreciated that the cable backend 100 can also function to enable the user 102 with the location-aware mobile device 104 depending on their current location to have at least partial control of anyone of the cable devices 105', 105', 106' and 106" associated with the televisions 107', 107", 109' and 109". Furthermore, it should be appreciated that the cable backend 100 can function to enable any number of users 102 with location-aware mobile devices 104 to have at least partial control over their respective cable devices 105, 105', 105", 106' and 106".

Figure 2A:
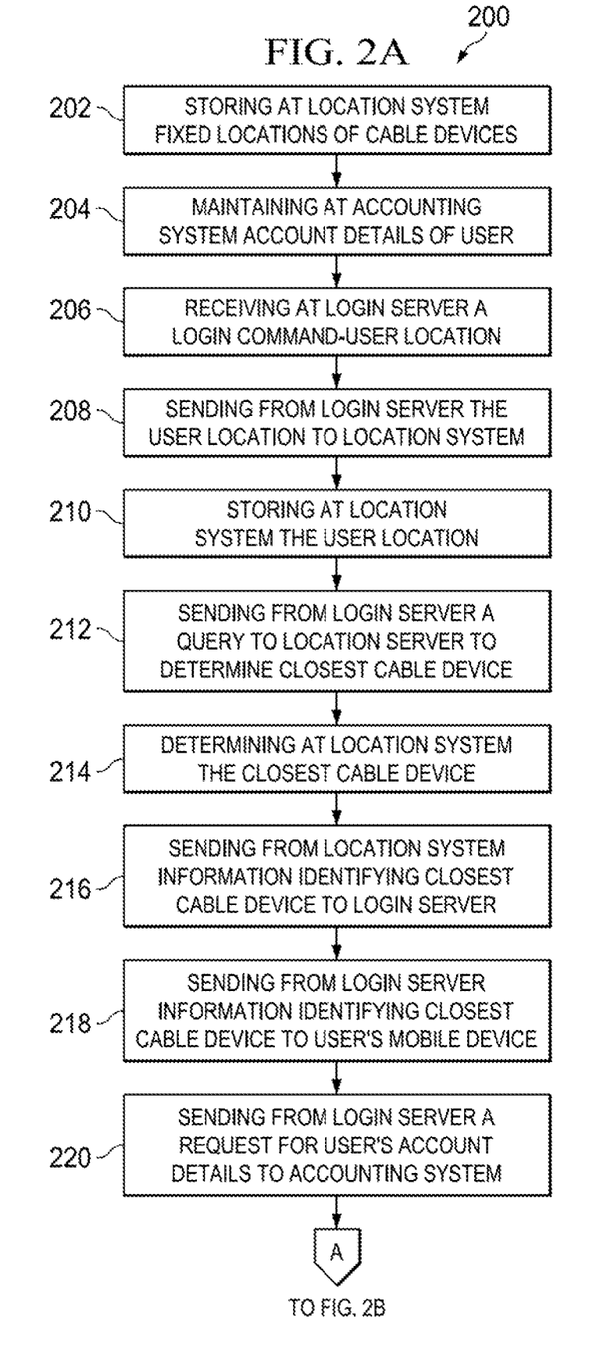
FIGS. 2A-2B is a flowchart illustrating the basic steps of a preferred method implemented by the cable backend for enabling the user with the location-aware mobile device to have at least partial control of the closest cable device (e.g., closest set top box, closest cable application) in accordance with an embodiment of the present invention.
Figure 2B:
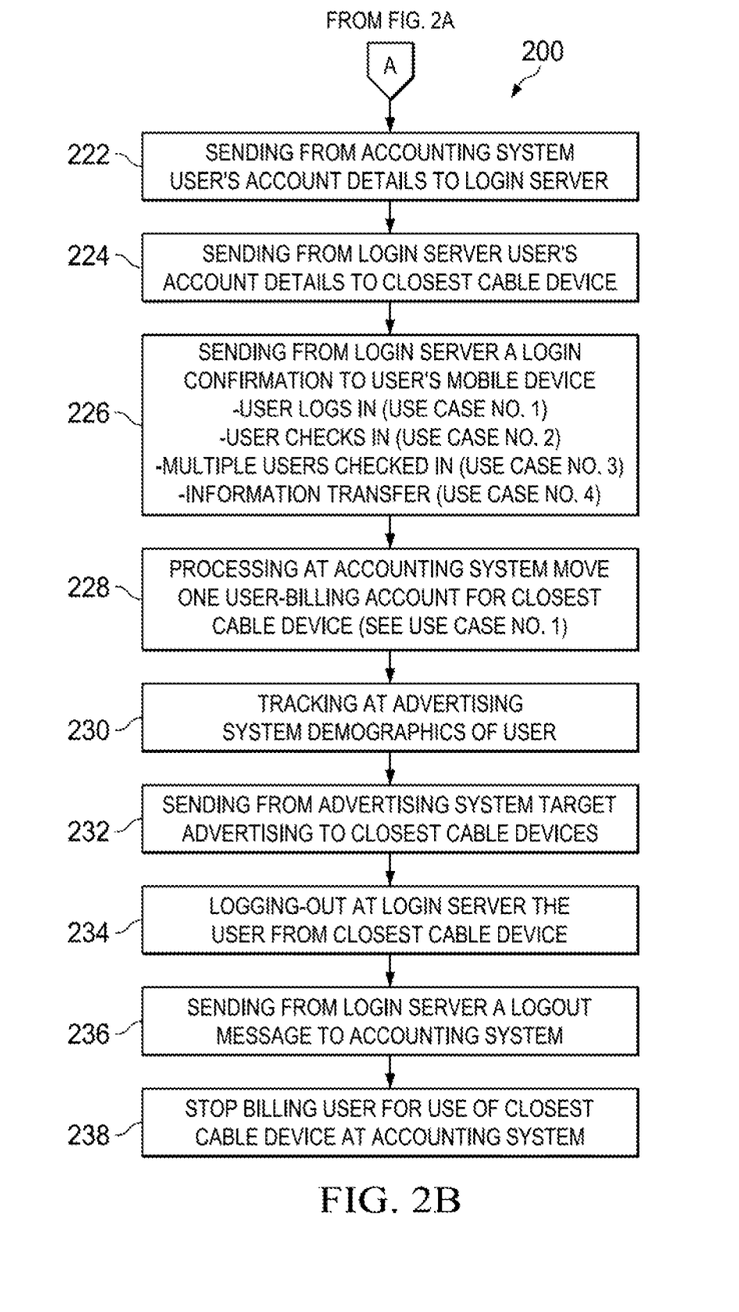

Referring to FIGS. 2A-2B, there is a flowchart illustrating the basic steps of a preferred method 200 implemented by the cable backend 100 for enabling the user 102 with the location-aware mobile device 104 to have at least partial control of the closest cable device 105 (e.g., closest set top box 105) in accordance with an embodiment of the present invention. The cable backend 100 includes the login server 108, the location system 110, the accounting system 112, and the advertising system 114. How the login server 108, the location system 110, the accounting system 112, and the advertising system 114 function to enable the user 102 with the location-aware mobile device 104 to have at least partial control of the closest cable device 105 (e.g., closest set top box 105) is described next.

At step 202, the location system 110 stores the fixed locations 120 (e.g., geographical locations 120) of the cable devices 105, 105', 105", 106' and 106". For example, each of the cable devices 105, 105', 105', 106' and 106" can be configured at installation to have a set location.

At step 204, the accounting system 112 stores and maintains the account details 122 (billing and subscription details 122) of the user 102. In addition, the accounting system 112 would store and maintain the account details 122 (billing and subscription details 122) for all of the users 102.

At step 206, the login server 108 receives the login command 124 from the location-aware mobile device 104 (see FIG. 1's step 1). Typically, the user 102 when located next to a set top box 105 (for example) would interact with an application 123 stored within their location-aware mobile device 104 to send the login command 124 to the login server 108. The login command 124 includes at least account information 125 (e.g., account number and password) associated with the user 102 and a current location 128 of the user 102. To accomplish this, the location-aware mobile device 104 includes a positioning system 126 (e.g., global positioning system 126) configured to determine the current location 128 of the user 102.

At step 208, the login server 108 sends the current location 128 of the user 102 to the location system 110 (see FIG. 1's step 2).

At step 210, the location system 110 stores the current location 128 of the user 102 (see FIG. 1's step 3).

At step 212, the login server 108 sends a query 130 to the location system 110 to determine which one of the cable devices 105, 105', 105", 106' and 106" is located closest to the current location 128 of the user 102 (see FIG. 1's step 4). If desired, the login server 108 can be configured to send the user's current location 128 and the query 130 at same time to the location system 110.

At step 214, the location system 110 upon receiving the query 130 determines which one of the cable devices 105, 105', 105", 106' and 106" is located closest to the current location 128 of the user 102 (see FIG. 1's step 5). For example, the location system 110 would compare the user's current location 128 to the previously stored fixed locations 120 of the cable devices 105, 105', 105", 106' and 106" to determine that the user 102 is located next to set top box 105 (closest set top box 105).

At step 216, the location system 110 sends information 132 identifying the closest set top box 105 to the login server 108 (see FIG. 1's step 6).

At step 218, the login server 108 sends the information 132 identifying the closest set top box 105 to the user's location-aware mobile device 104 (see FIG. 1's step 7).

At step 220, the login server 108 send a request 134 to the accounting system 112 for at least a portion 135 (e.g., rental history, active rentals, demographics, rating restrictions, billing information (in the case of full set top control)) of the account details 122 of the user 102 (see FIG. 1's step 8). In addition, the login server 108 informs the accounting system 112 that the user 102 will have at least temporary control of the closest set top box 105 to select the specific content which is displayed on the closest television 107.

At step 222, the accounting system 112 sends the portion 135 (e.g., rental history, active rentals, demographics, rating restrictions, billing information (in the case of full set top control)) of the user's account details 122 to the login server 108 (see FIG. 1's step 9).

At step 224, the login server 108 sends the portion 135 of the user's account details 122 to the closest set top box 105 (see FIG. 1's step 10). At this point, the closest set-top box 105 which happens to be located outside of the home 116 of the user 102 can now function in an identical manner as the cable devices 105' and 106' which are located in the home 116 of the user 102.

At step 226, the login server 108 sends a login confirmation 136 to the location-aware mobile device 104 to indicate to the user 102 that they now have at least partial control of the closest set top box 105 so they can now control what content is displayed on the closest television 107 (see exemplary use case nos. 1-4)(see FIG. 1's step 11).

At step 228, the accounting system 112 processes more than one user-billing account for the closest set top box 105 if the user 102 is logged-in to the closest set top box to 105 (see exemplary use case no. 1)(see FIG. 1's step 12). In this situation, the user 102 has temporary control of the closest set top box 105 using the location-aware mobile device 104 or the traditional set top box remote control 118 so the user 102 can at least navigate video on demand catalogs, watch premium content, and rent movies that will be processed through their billing account. In particular, the accounting system 112 would process one user-billing account associated with the closest set top box 105 for the original owner/subscriber (not shown) and process another user-billing account associated with the closest set top box 105 for the user 102. In other words, the user 102 is responsible for paying any fees for viewing content on the closest television 107 while the user 102 is logged-in to and has control of the closest set top box 105. Plus, the original owner/subscriber would be responsible for paying any fees for viewing content on the closest television 107 when the user 102 is not logged-in to and controlling the closest set top box 105.

At step 230, the advertising system 114 (optional) interacts with the location system 110 and obtains the user's current location 128 to track demographics of the user 102 (see FIG. 1's step 13). If desired, the advertising system 114 can be configured to interact with the location system 110 to obtain the current locations of multiple users (not shown) to track the demographics of the multiple users 102 (only one shown).

At step 232, the advertising system 114 (optional) is configured to utilize the user's location information 128 and other information (e.g., user's account details 122, other user's location information) to send target advertising 138 to the user 102 and if desired the other users (not shown) based on the tracked demographics (see FIG. 1's step 14).

At step 234, the login server 108 logs-out the user 102 from the closest set top box 105 if the user 102 uses the location-aware mobile device 104 to actively close their control of the closest set top box 105 (see FIG. 1's step 15). In addition, the login server 108 can log-out the user 102 from the closest set top box 105 if the user 102 moves the location-aware mobile device 104 a predetermined distance away from the closest set top box 105. To accomplish this, the location-aware mobile device 104 would have to send periodic updates of the user's current location 128 to the login server 108.

At step 236, the login server 108 sends a log-out message 139 to the accounting system 112 if the login server 108 had complete control of the closest set top box 105 using the location-aware mobile device 104 or the traditional set top box remote control 118 to at least navigate video on demand catalogs, watch premium content, and rent movies (see exemplary use case no. 1)(see FIG. 1's step 16).

At step 238, the accounting system 112 upon receiving the log-out message 139 would stop billing the user 102 for content displayed on the closest television 107 and start billing the original subscriber-user associated with the closest set top box 105 for future content displayed on the closest television 107 (see FIG. 1's step 17).

Figure 3:
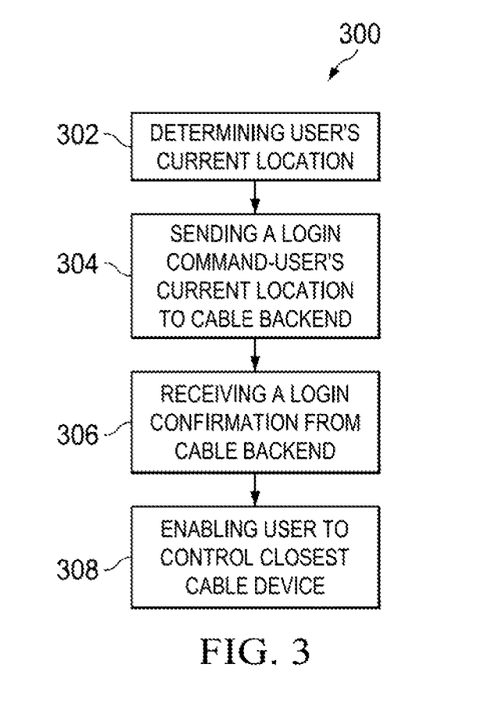
FIG. 3 is a flowchart illustrating the basic steps of a preferred method implemented by the location-aware mobile device for enabling the user to have at least partial control of a closest cable device (e.g., closest set top box, closest cable application) in accordance with an embodiment of the present invention.

Referring to FIG. 3, there is a flowchart illustrating the basic steps of a preferred method 300 implemented by the location-aware mobile device 104 for enabling the user 102 to have at least partial control of a closest cable device 105 in accordance with an embodiment of the present invention. At step 302, the mobile device's positioning system 126 determines a current location 128 of the user 102. At step 304, the mobile device 104 sends the login command 124 to the cable backend 100, where the login command 124 includes at least account information 125 associated with the user 102 and the current location 128 of the user 102. At step 306, the mobile device 104 receives a login confirmation 136 from the cable backend 100, where the login confirmation 136 indicates to the user 102 that they now have at least partial control of the closest cable device 105 (for example) to control content displayed on the closest television 107. At step 308, the mobile device 104 enables the user 102 to interact with a user interface 160 to control the closest cable device 105.

From the foregoing, one skilled in the art will appreciate that the cable backend 100 (includes satellite's television backend) is configured to associate both users and cable devices (set top boxes, cable applications) with a physical location—a fixed location in the case of the cable devices and a dynamic location in the case of the users. The cable devices can be configured at installation to have a set location, and the users would have a location-aware mobile device configured to have an positioning system (such as a mobile device with a global positioning system (GPS)) which updates the cable backend 100 at appropriate instances with their current location. In this way, the cable backend 100 can enable a user with their location-aware mobile device to have at least partial control of a closest cable device (e.g., set top box, cable application) so they can now control the content displayed on the closest television. The cable backend 100 has many advantages several of which are as follows:

1) The cable backend 100 allows a user to interact with any compatible cable device, either in the role of an owner who is logged in (in which case the cable device acts identically to their household cable device(s)) or in the role of a viewer who is "checked in" (in which case they have limited use of the cable device). The user has the option to automatically access any nearby cable device to control the content displayed on the corresponding nearby television.

2) The cable backend 100 allows users to continue their "on the go" lifestyle while also supporting the existing, traditional technologies, such as televisions and set top boxes.

3) The cable backend 100 by allowing users to "check in" to a nearby cable device enables the users to advertise to friends such as showing them how useful video-on-demand content is, or how much they enjoyed a particular movie without forcing their friends to see the content at the user's home.

4) The cable backend 100 can track who is watching what content, and where they are watching that content which is desirable in several ways to the advertising industry. For example, the cable backend 100 by being able to more accurately track demographics (how many users are actually seeing an ad or movie) can better target ads to those users (based on the tracked demographics) which is very valuable to the cable industry.

Although multiple embodiments of the present invention have been illustrated in the accompanying Drawings and described in the foregoing Detailed Description, it should be understood that the invention is not limited to the disclosed embodiments, but instead is also capable of numerous rearrangements, modifications and substitutions without departing from the present invention that as has been set forth and defined within the following claims.

The invention claimed is:

1. A cable backend for enabling a user with a location-aware mobile device to have at least partial control of a closest cable device associated with a closest television, the cable backend comprising:
    a login server;
    a location system configured to store fixed locations of a plurality of cable devices; and
    an accounting system configured to maintain account details of the user,
    the login server configured to receive a login command from the location-aware mobile device, the login command includes at least account information associated with the user and a current location of the user;
    the login server configured to send the current location of the user to the location system;
    the location system configured to store the current location of the user;
    the login server configured to send a query to the location system to determine which one of the plurality of cable devices is located closest to the current location of the user;
    the location system configured to determine which one of the plurality of cable devices is located closest to the current location of the user;
    the location system configured to send information identifying the closest cable device to the login server;
    the login server configured to send the information identifying the closest cable device to the location-aware mobile device;
    the login server configured to send a request to the accounting system for at least a portion of the account details of the user stored therein;
    the accounting system configured to send the at least a portion of the account details of the user to the login server;
    the login server configured to send the at least a portion of the account details of the user to the closest cable device;
    the login server configured to send a login confirmation to the location-aware mobile device to indicate to the user that they now have at least partial control of the closest cable device to control content displayed on the closest television;
    the login server logs-out the user from the closest cable device if the user utilizes the location-aware mobile device to actively close the at least partial control of the closest cable device or the user moves the location-aware mobile device a predetermined distance away from the closest cable device;
    the login service sends a logout message to the accounting system which then stops billing the user for content displayed on the closest television and starts billing an original subscriber-user of the closest cable device for the content displayed on the closest television;
    the plurality of cable devices includes one or more cable devices associated with one or more televisions located in a home of the user and multiple cable devices associated with multiple televisions located outside of the home of the user; and
    the closest cable device is located outside of the home of the user but functions in an identical manner as the one or more cable devices located in the home of the user after the login server sends the at least a portion of the account details of the user to the closest cable device.

2. The cable backend of claim 1, further comprising an advertising system configured to interact with the location system to track demographics of at least the user and configured to send target advertising to at least the user based on the tracked demographics.

3. The cable backend of claim 1, wherein the accounting system is further configured to process more than one user-billing account for the closest cable device if the user has complete control of the closest cable device to control content displayed on the closest television.

4. The cable backend of claim 1, wherein the login server sends the at least a portion of the account details of the user to the closest cable device which logs-in the user to the closest cable device where the user has complete control of the closest cable device using the location-aware mobile device or a traditional cable device remote control so the user can at least navigate video on demand catalogs, watch premium content, and rent movies that will be processed through their billing account.

5. The cable backend of claim 1, wherein the login server sends the at least a portion of the account details of the user to the closest cable device which checks-in the user to the closest cable device where the user has limited control of the closest cable device using a traditional cable device remote control so the user can at least access their personal content, free content, or any content they have previously purchased.

6. The cable backend of claim 1, wherein the login server sends the at least a portion of the account details of the user to the closest cable device which checks-in the user to the closest cable device which also happens to have other users checked-in so the user has limited control of the closest cable device using a traditional cable device remote control where the user can at least access their personal content, their free content, or any content they have previously purchased in addition to accessing the other users personal content, free content, or any content they have previously purchased.

7. The cable backend of claim 6, further comprising an advertising system configured to interact with the location system to track demographics of the user and other users checked-in to have limited control of the closest cable device and further configured to send target advertising to the user and other users based on an aggregate of the tracked demographics of the user and the other users checked-in to have limited control of the closest cable device.

8. The cable backend of claim 1, wherein the login server sends the login confirmation to the location-aware mobile device to indicate to the user that they now have at least partial control of the closest cable device where the user has control of the closest cable device and plays content but has to leave the closest cable device and uses the location-aware mobile device to send a request to the login server to save information about the content such that the user can access and continue playing the content at a later time at the closest cable device or any other cable device.

9. The cable backend of claim 1, wherein the plurality of cable devices includes at least one of set top boxes and cable applications.

10. A method for enabling a user with a location-aware mobile device to have at least partial control of a closest cable device associated with a closest television, the method implemented by a cable backend comprising a login server, a location system, and an accounting system, the method comprising the steps of:
   storing, at the location system, fixed locations of a plurality of cable devices;
   maintaining, at the accounting system, account details of the user,
   receiving, at the login server, a login command from the location-aware mobile device, the login command includes at least account information associated with the user and a current location of the user;
   sending, from the login server, the current location of the user to the location system;
   storing, at the location system, the current location of the user;
   sending, from the login server, a query to the location system to determine which one of the plurality of cable devices is located closest to the current location of the user;
   determining, at the location system, which one of the plurality of cable devices is located closest to the current location of the user;
   sending, from the location system, information identifying the closest cable device to the login server;
   sending, from the login server, the information identifying the closest cable device to the location-aware mobile device;
   sending, from the login server, a request to the accounting system for at least a portion of the account details of the user stored therein;
   sending, from the accounting system, the at least a portion of the account details of the user to the login server;
   sending, from the login server, the at least a portion of the account details of the user to the closest cable device;
   sending, from the login server, a login confirmation to the location-aware mobile device to indicate to the user that they now have at least partial control of the closest cable device to control content displayed on the closest television;
   logging-out, at the login server, the user from the closest cable device if the user uses the location-aware mobile device to actively close the at least partial control of the closest cable device or the user moves the location-aware mobile device a predetermined distance away from the closest cable device;
   sending, from the login server, a logout message to the accounting system;
   stopping, at the accounting system, billing of the user for content displayed on the closest television and starting billing an original subscriber-user of the closest cable device for content displayed on the closest television;
   wherein the plurality of cable devices includes one or more cable devices associated with one or more televisions located in a home of the user and multiple cable devices associated with multiple televisions located outside of the home of the user; and
   wherein the closest cable device is located outside of the home of the user but functions in an identical manner as the one or more cable devices located in the home of the user after the login server sends the at least a portion of the account details of the user to the closest cable device.

11. The method of claim 10, wherein the cable backend further comprising an advertising system and the method further comprising the steps of:
   tracking, at the advertising system, demographics of at least the user; and
   sending, from the advertising system, target advertising to at least the user based on the tracked demographics.

12. The method of claim 10, further comprising the step of processing, at the accounting system, more than one user-billing account for the closest cable device if the user has complete control of the closest cable device to control content displayed on the closest television.

13. The method of claim 10, wherein the login server sends the at least a portion of the account details of the user to the closest cable device which logs-in the user to the closest cable device where the user has complete control of the closest cable device using the location-aware mobile device or a traditional cable device remote control so the user can at least navigate video on demand catalogs, watch premium content, and rent movies that will be processed through their billing account.

14. The method of claim 10, wherein the login server sends the at least a portion of the account details of the user to the closest cable device which checks-in the user to the closest cable device where the user has limited control of the closest cable device using a traditional cable device remote control so the user can at least access their personal content, free content, or any content they have previously purchased.

15. The method of claim 10, wherein the login server sends the at least a portion of the account details of the user to the closest cable device which checks-in the user to the closest cable device which also happens to have other users checked-in so the user has limited control of the closest cable device using a traditional cable device remote control where the user can at least access their personal content, their free content, or any content they have previously purchased in addition to accessing the other users personal content, free content, or any content they have previously purchased.

16. The method of claim 15, further comprising the steps of:
   tracking, at the advertising system demographics of the user and other users checked-in to have limited control of the closest cable device; and
   sending, from the advertising system, target advertising to the user and other users based on an aggregate of the tracked demographics of the user and the other users checked-in to have limited control of the closest cable device.

17. The method of claim 10, wherein the login server sends the login confirmation to the location-aware mobile device to indicate to the user that they now have at least partial control of the closest cable device where the user has control of the closest cable device and plays content but has to leave the closest cable device and uses the location-aware mobile device to send a request to the login server to save information about the content such that the user can access and continue playing the content at a later time at the closest cable device or any other cable device.

18. The method of claim 10, wherein the plurality of cable devices includes at least one of set top boxes and cable applications.

* * * * *

UNITED STATES PATENT AND TRADEMARK OFFICE
CERTIFICATE OF CORRECTION

PATENT NO. : 8,528,014 B2  
APPLICATION NO. : 13/092260  
DATED : September 3, 2013  
INVENTOR(S) : Reynolds et al.

Page 1 of 1

It is certified that error appears in the above-identified patent and that said Letters Patent is hereby corrected as shown below:

In the Specification

In Column 3, Line 26, delete "of" and insert -- of: --, therefor.

In Column 7, Line 64, delete "device 102" and insert -- device 104 --, therefor.

In Column 8, Line 43, delete "device 102" and insert -- device 104 --, therefor.

In Column 13, Line 7, delete "which is" and insert -- which are --, therefor.

Signed and Sealed this  
Thirty-first Day of December, 2013

Margaret A. Focarino  
*Commissioner for Patents of the United States Patent and Trademark Office*